(12) United States Patent
Johnson (10) Patent No.: US 6,912,040 B2
(45) Date of Patent: Jun. 28, 2005

(54) PHOTOFINISHERS

(75) Inventor: Bruce G. Johnson, Ridgefield, WA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 132 days.

(21) Appl. No.: 10/427,076

(22) Filed: Apr. 30, 2003

(65) Prior Publication Data

US 2004/0218156 A1 Nov. 4, 2004

(51) Int. Cl.⁷ .......................... G03B 27/32; B32B 31/00
(52) U.S. Cl. ........................................ 355/27; 156/367
(58) Field of Search ............................ 355/27–29, 40, 355/77; 83/13; 156/71, 367, 285

(56) References Cited

U.S. PATENT DOCUMENTS

| | | | |
|---|---|---|---|
| 6,361,225 B1 | 3/2002 | Szajewski et al. | |
| 6,459,865 B2 | 10/2002 | Kusayanagi | |
| 6,460,687 B1 * | 10/2002 | Escobedo et al. | 198/624 |
| 6,769,467 B2 * | 8/2004 | Escobedo et al. | 156/367 |
| 2003/0126962 A1 * | 7/2003 | Bland et al. | 83/13 |

* cited by examiner

*Primary Examiner*—Henry Hung Nguyen (57) ABSTRACT

Photofinishers and photo finishing methods are provided. A laminate comprising a transparent medium disposed on at least one image on a photographic medium is produced using a laminator of a photofinisher. A texture is disposed in the transparent medium of the laminate using a texurizer of the photofinisher during a texturing mode of operation.

19 Claims, 5 Drawing Sheets

PHOTOFINISHERS

FIELD OF THE INVENTION

The present invention relates generally to photo processing.

BACKGROUND

Many photofinishers employ a wet process, such as a silver-halide process, for photo finishing. The silver-halide process typically includes treating a photographic medium that is laminated on both sides, e.g., with polyethylene, with a chemical to transfer a photographic image onto the laminate. To produce different surface finishes, e.g., matte, luster, glossy, etc., the image is transferred onto a laminated photographic medium having a surface that corresponds to one of the desired surface finishes. This means that a separate photographic medium is used to produce each different surface finish, e.g., a glossy medium for a glossy finish, a matte medium for a matte finish, etc. In some applications, changing to a different surface finish requires stopping the photo-finishing process using a photographic medium for one surface finish and changing to a photographic medium for the different surface finish, which can be time consuming and costly because it requires an inventory of more than one photographic medium. Other applications involve breaking a photo-finishing order according to different surface finishes and using one photofinisher for each surface finish.

With the advent of digital cameras, many applications involve producing photographic prints from digital data. One application involves creating an analog image from the digital data and using the silver-halide process described above to produce prints having various textures from the analog image. Therefore, this application includes the various surface-finishing problems of silver-halide processing. Another application involves using an electro-photographic printer that converts, e.g., rasterizes, digital data into a format that can be printed on electro-photographic paper in the form of prints. The prints are often laminated with a thin plastic skin to protect the image. However, there is no provision for producing different surface textures.

SUMMARY

One embodiment of the present invention provides a photofinisher halving a laminator adapted to produce a laminate comprising a transparent medium disposed on at least one image on a photographic medium and a texturizer adapted to dispose a texture in the transparent medium of the laminate during a texturing mode of operation.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
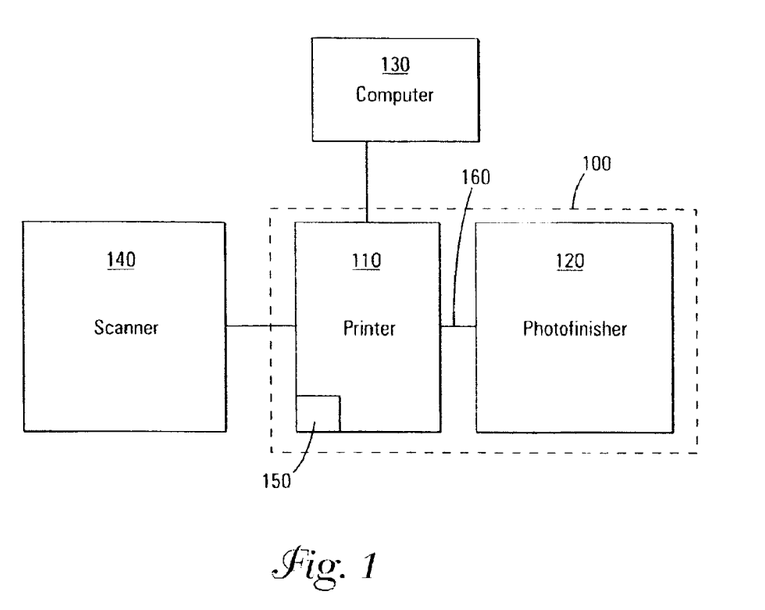
FIG. 1 is a block diagram illustrating a photographic processor according to an embodiment of the present invention

FIG. 1 is a block diagram illustrating a photographic processor 100 according to an embodiment of the present invention. For one embodiment, photographic processor 100 includes a printer 110, such as an electro-photographic printer, e.g., the Indigo Digital Printing Press available from Hewlett-Packard Company (Palo Alto, Calif., USA), electrically connected to a photofinisher 120.

For one embodiment, printer 110 receives digital image data from a computer 130, a scanner 140, etc. For another embodiment, printer 110 receives digital image data from a removable storage media 150 removably connected to printer 110. Examples of storage media 150 include flash memory cards, floppy disks, compact discs, Universal Serial Bus (USB) drives, etc.

For some embodiments, printer 110 prints images corresponding to the image data on a photographic medium 160, such as photographic paper. For one embodiment, photographic medium 160 is in the form of a continuous sheet (or web) disposed on a roller. For another embodiment, after the images are printed on photographic medium 160, photographic medium is sent to photofinisher 120 for finishing.

Figure 2:
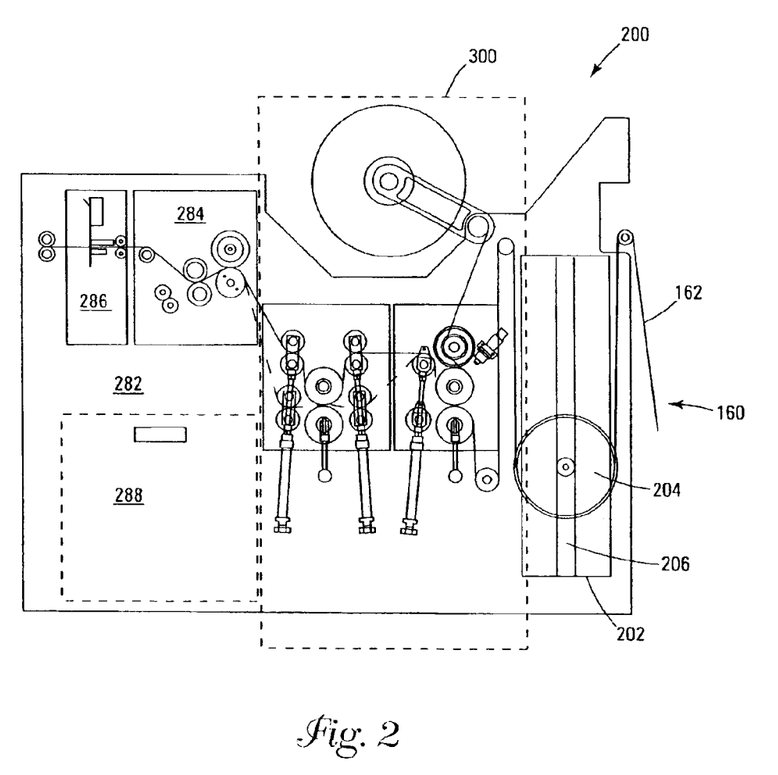
FIG. 2 illustrates a photofinisher according to another embodiment of the present invention.

FIG. 2 illustrates a photofinisher 200 according to another embodiment of the present invention. For one embodiment, photofinisher 200 receives photographic medium 160 from a printer, such as printer 110. For another embodiment, one or more images corresponding to digital image data are printed on surface 162 of photographic medium 160.

For some embodiments, photographic medium 160 is directed through a buffer 202 of photofinisher 200, as shown in FIG. 2. Buffer 202 compensates for the possibility that photographic medium 160 may exit printer 110 at a different speed than photographic medium 160 passes through photofinisher 200. For one embodiment, buffer 202 has a roller 204 that is movable within a slot 206 of buffer 202. For another embodiment, when photographic medium 160 passes through photofinisher 200 faster than photographic medium 160 exits printer 110, roller 204 moves upward in slot 206. Conversely, when photographic medium 160 passes through photofinisher 200 slower than photographic medium 160 exits printer 110, roller 204 moves downward in slot 206.

Photographic medium 160 exits buffer 202 and is directed to a finishing section 300 of photofinisher 200. Finishing section 300 is best viewed in FIG. 3. Photographic medium 160 is directed to a laminator 310 of finishing section 300. In particular, photographic medium 160 is directed to a nip 312 between rollers 314 and 316 of laminator 310. A transparent medium 320, e.g., of plastic, in the form of a continuous sheet (or web) disposed on a roller 321, for one embodiment, is also directed to laminator 310. In particular, transparent medium 320 is also directed to nip 312. While in nip 312, transparent medium 320 is bonded to surface 162 of photographic medium 160 to form a laminate 322 that has a layer of transparent medium 320 disposed on the one or more images printed on surface 162 to cover the one or more printed images.

Figure 3:
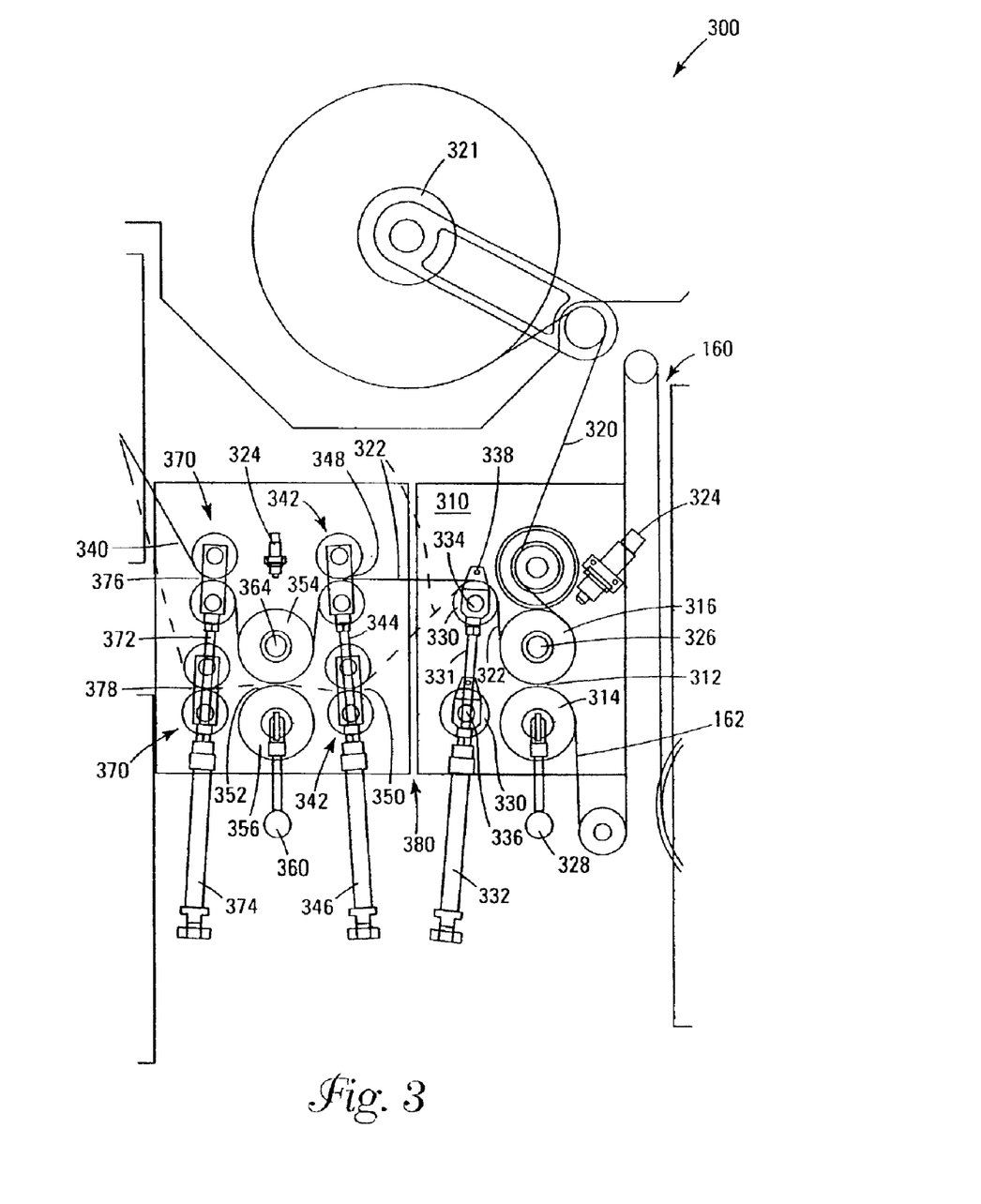
FIG. 3 illustrates a finishing section of the photofinisher of FIG. 1 according to another embodiment of the present invention.

Specifically, roller 316 is heated, in one embodiment, by a heater, such as a light bulb disposed in a hollow central core 326 of roller 316. Alternatively, roller 316 can be heated by resistors embedded in roller 316, a heated fluid, such as oil, flowing through hollow central core 326 of roller 316, etc. For one embodiment, a temperature sensor 324, such as an infrared temperature sensor, monitors the temperature of roller 316. In addition to heating transparent medium 320 using roller 316, an actuator 328, such as a lever, e.g., activated by air, hydraulics, a solenoid, etc., selectively moves roller 314 to close nip 312 so that transparent medium 320 and photographic medium 160 are squeezed together between rollers 314 and 316. Heating transparent medium 320 and squeezing transparent medium 320 and photographic medium 160 between rollers 314 and 316 bonds transparent medium 320 to surface 162 of photographic medium 160 to form laminate 322. Actuator 328 can selectively open nip 312, e.g., for threading finisher 200 with transparent medium 320 and photographic medium 160.

After exiting nip 312, laminate 322 is directed to a movable roller 330. For one embodiment, roller 330 is attached to a piston arm 331 of piston-cylinder 332 for movement thereby. Piston-cylinder 332 can operate on air, hydraulic fluid, or the like. Roller 330 is movable between positions 334 and 336, as shown in FIG. 3. For some embodiments, roller 330 is moved to position 336 when finisher is stopped to hold laminate 322 away from roller 316 when nip 312 is open or closed. This reduces the contact area between laminate 322 and roller 316 and thus acts to prevent heat damage to laminate 322. For one embodiment, laminate 322 passes between a pin 338 and roller 330 so that laminate 332 follows roller 330 when roller 330 moves from position 334 to 336. This acts to keep laminate 332 taut when roller moves from position 334 to 336, which acts hold laminate 322 away from roller 316 when nip 312 is open or closed.

Directing laminate 322 to roller 330 while in position 334 maintains contact between laminate 322 and roller 316 for a longer time as opposed to directing laminate 322 to roller 330 while in position 336. The longer contact time enables transparent medium 320 to flow better on surface 162 of photographic medium 160, producing a more even coating of transparent medium 320. For other embodiments, the longer contact time acts to keep transparent medium 320 soft and thus more malleable in preparation for disposing a texture in laminate 322 using a texturizer 340 of photofinisher 200.

Laminate 322 is directed from laminator 310 to texturizer 340, where, for some embodiments, the texture is disposed in transparent medium 320 of laminate 322. Specifically, laminate 322 is directed from roller 330 to between movable rollers 342 of texturizer 340. For some embodiments, a single movable roller can replace movable rollers 342. For one embodiment, rollers 342 are attached to a piston arm 344 of piston-cylinder 346 for movement thereby. Piston-cylinder 346 can operate on air, hydraulic fluid, or the like. Rollers 342 are movable between positions 348 and 350, as shown in FIG. 3. A dashed line is used in FIG. 3 to represent laminate 322 being directed from roller 330 to rollers 342 in position 350, while a solid line represents laminate 322 being directed from roller 330 to rollers 342 in position 348.

Laminate 322 is directed from rollers 342 to a nip 352 between rollers 354 and 356. For one embodiment, roller 354 is a textured roller having a texture that is the reverse of the texture to be disposed on laminate 322. Exemplary textures are brushstroke, linen, canvas, matte, etc. For another embodiment, the texture is disposed on roller 354 by plasma spraying, sand or grit blasting, chemical etching, laser machining, etc.

An actuator 360, such as a lever, e.g., activated by air, hydraulics, a solenoid, etc., selectively moves roller 356 to selectively open and close nip 352. When nip 352 is closed, laminate 322 is squeezed between rollers 354 and 356. Actuator 360 selectively opens nip 352, e.g., for threading photofinisher 200 laminate 322. For one embodiment, a heater, such as a light bulb, disposed in a hollow central core 364 of roller 354 heats roller 354 for heating laminate 322. Alternatively, roller 354 can be heated by resistors embedded in roller 354, a heated fluid, such as oil, flowing through hollow central core 364 of roller 354, etc. For another embodiment, temperature sensor 324 monitors the temperature of roller 354.

Laminate 322 is directed from nip 352 to between movable rollers 370 of texturizer 340. For some embodiments, a single movable roller can replace movable rollers 370. For one embodiment, rollers 370 are attached to a piston arm 372 of piston-cylinder 374 for movement thereby. Piston-cylinder 374 can operate on air, hydraulic fluid, or the like. Rollers 370 are movable between positions 376 and 378, as shown in FIG. 3.

To dispose the texture in transparent medium 320 of laminate 322, for one embodiment, rollers 342 and rollers 370 are respectively moved to positions 348 and 376 and nip 352 is closed. Moving rollers 342 to position 348 brings laminate 322 into contact with roller 354 before laminate 322 enters nip 352, enabling roller 354 to heat laminate 322 before laminate 322 enters nip 352. This softens transparent medium 320, causing transparent medium 320 to be more malleable. This enables transparent medium 320 to flow into the texture of roller 354, causing the texture to be transferred to transparent medium 320 when laminate 322 is in nip 352 and is squeezed between rollers 354 and 356. Moving rollers 370 to position 376 maintains laminate 322 in contact with roller 354 after laminate 322 exits nip 352, enabling continued flow of transparent medium 320 into the texture of roller 354. For some embodiments, it may not be necessary to maintain laminate 322 in contact with roller 354 after laminate 322 exits nip 352. For these embodiments, laminate 322 is directed to rollers 370 while in position 378 after exiting nip 352.

Photofinisher 200 can be selectively operated in a texture bypass mode, e.g., for producing images having a glossy finish. For one embodiment, respectively moving rollers 342 and rollers 370 to positions 350 and 378 and opening nip 352 selects the texture bypass mode. When rollers 342 and rollers 370 are respectively in positions 350 and 378 and nip 352 is open, rollers 342 and rollers 370 hold laminate 322 against roller 356 and away from roller 354, causing laminate 322 to move in contact with roller 356 without contacting roller 354. For another embodiment rollers 342 and rollers 370 are respectively in positions 350 and 378 nip 352 is closed and laminate 322 is stopped. This a to prevent heat damage to laminate 322 when laminate 322 is stopped.

For various embodiments, photofinisher 200 can be changed from the texture bypass mode to a texturing mode on the fly. That is, without changing photographic medium 160 and/or without stopping laminator 310, i.e., the transport photographic medium 160 and transparent medium 320 through laminator 310. For some embodiments, closing nip 352 to change from the texture bypass mode to the texturing mode requires that texturizer 340 be stopped, i.e., stopping the transport of laminate 322 through texturizer 340 before closing nip 352, without stopping laminator 310. To compensate for this or other variations in the speeds of laminate 322 between laminator 310 and texturizer 340, a buffer is disposed between laminator 310 and texturizer 340, as indicated by arrow 380. For some embodiments, the buffer is as described above for buffer 202.

As is best seen from FIG. 2, for one embodiment, photofinisher 200 includes a post-finisher 282 for performing post-finishing processes. Post fishing processes may include slitting laminate 322 along the direction of motion of laminate 322 using a slitter 284, cutting laminate 322 substantially perpendicular to the direction of motion of laminate 322 using a cutter 286, and disposing of any waste in a waste container 288, etc.

Figure 4:
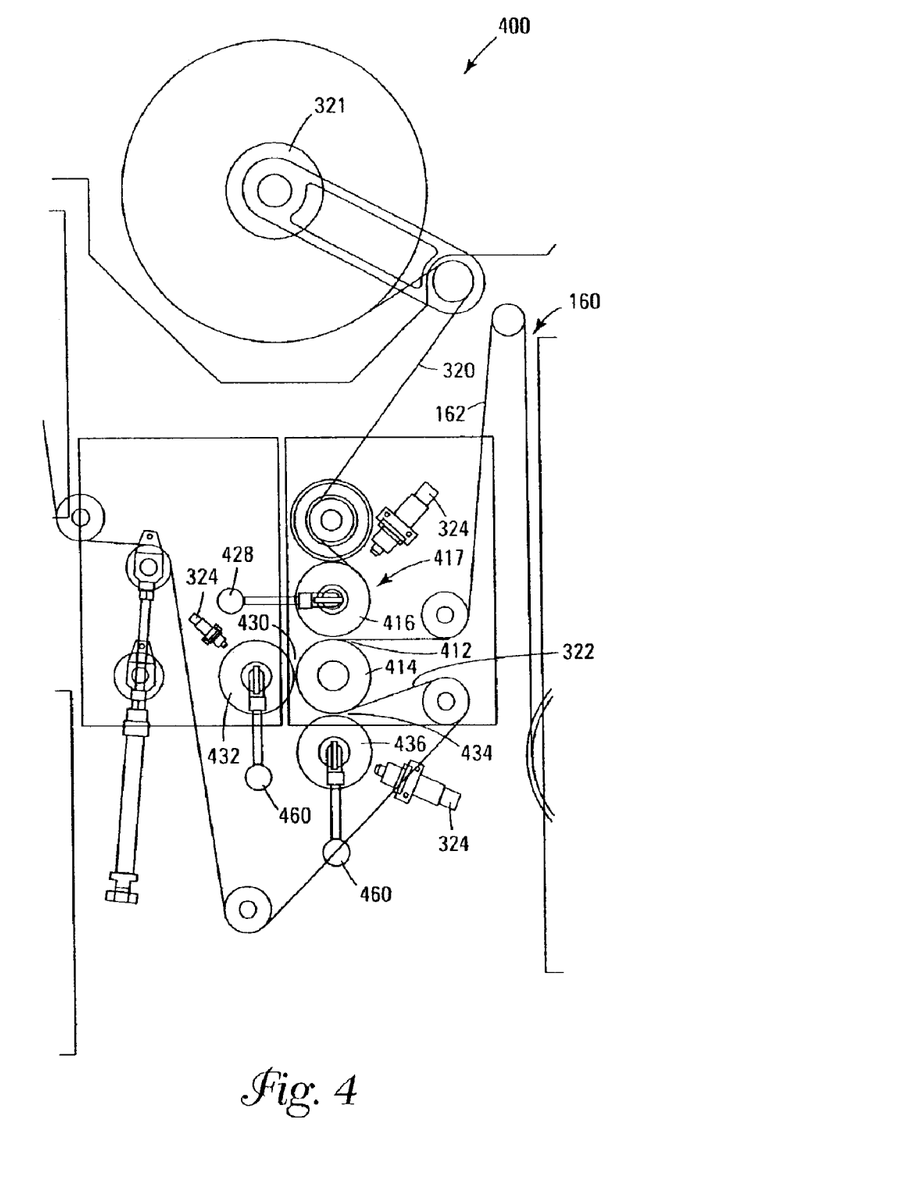
FIG. 4 illustrates a finishing section of a photofinisher according to another embodiment of the present invention.

FIG. 4 illustrates a finishing section 400 of a photofinisher, such as photofinisher 200, according to another embodiment of the present invention. Reference numbers common to FIGS. 3 and 4 are as discussed above for FIG. 3. Photographic medium 160 is directed to a nip 412 between rollers 414 and 416, e.g., from a buffer, such as buffer 202 of photofinisher 200. For some embodiments, nip 412 and rollers 414 and 416 constitute a laminator 417. Transparent medium 320 is also directed to nip 412. While in nip 412, transparent medium 320 is bonded to surface 162 of photographic medium 160 to form laminate 322.

Roller 416 is heated, in one embodiment, by a heater, such as a light bulb disposed in a central hollow core of roller 416. Alternatively, roller 416 can be heated by resistors embedded in roller 416, a heated fluid, such as oil, flowing through the hollow central core, etc. In addition to heating transparent medium 320 using roller 416, an actuator 428, such as a lever, e.g., activated by air, hydraulics, a solenoid, etc., selectively moves roller 416 to close nip 412 so that transparent medium 320 and photographic medium 160 are squeezed together between rollers 414 and 416. Heating transparent medium 320 using roller 416 and squeezing transparent medium 320 and photographic medium 160 between rollers 414 and 416 bonds transparent medium 320 to surface 162 of photographic medium 160 to form laminate 322. Actuator 428 can selectively open nip 412, e.g., for threading finisher 200 with transparent medium 320 and photographic medium 160. For one embodiment, temperature sensor 324 monitors the temperature of roller 416.

Laminate 322 is directed from nip 412 to a nip 430 between roller 414 and a roller 432. Subsequently, laminate 322 is directed from nip 430 to a nip 434 between roller 414 and a roller 436. Rollers 432 and 436 are textured rollers, each having a different texture that is the reverse of the texture to be disposed on laminate 322. For one embodiment, rollers 432 and 436 are textured as described for roller 354 of finishing section 300 shown in FIG. 3. For another embodiment, nip 430 and rollers 414 and 432 and nip 434 and rollers 414 and 436 constitute a texturizer 438.

Each of rollers 432 and 436 are movable for selectively opening and closing nips 430 and 434, respectively. Actuators 460, such as levers, e.g., activated by air, hydraulics, solenoids, etc., selectively move rollers 432 and 436. When nip 430 is closed laminate 322 is squeezed between rollers 432 and 414. When nip 434 is closed laminate 322 is squeezed between rollers 436 and 414. For one embodiment, nips 430 and 434 are opened for threading finishing section 400.

When laminate 322 exits nip 412, transparent medium 320 is relatively soft and malleable due to heating by roller 416. For some embodiments, e.g., for certain textures, transparent medium 320 is sufficiently soft and malleable so that when laminate 322 is squeezed between rollers 432 and 414 or between rollers 436 and 414, transparent medium 320 can flow into the texture of the respective one of rollers 432 or 436 and thus be texturized. For other embodiments, each of rollers 432 and 436 is heated, e.g., by a heater, such as a light bulb, disposed in a hollow central core of the respective one of rollers 432, resistors embedded in the respective one of rollers 432 and 436, a heated fluid, such as oil, flowing through the hollow central core of the respective one of rollers, etc. This provides additional heating for making transparent medium 320 softer and more malleable. For one embodiment, temperature sensors 324 monitor the temperatures of rollers 432 and 436.

For various embodiments, finishing section 400 can be selectively changed from a texture bypass mode to a texturing mode on the fly. That is, without changing photographic medium 160. To select the texture bypass mode, e.g., for producing images having a glossy finish, nips 430 and 434 are opened and laminate 322 passes through nips 430 and 434 in contact with roller 414, but without contacting either of rollers 432 or 436. To select the texturing mode either nip 432 or nip 434 is closed. For example, to transfer the texture of roller 432 to transparent medium 320, nip 430 is closed and nip 434 is opened. While laminate 322 is in nip 430, laminate 434 is squeezed between rollers 414 and 432, causing transparent medium 430 to flow into the texture of roller 432. To transfer the texture of roller 436 to transparent medium 320, nip 434 is closed and nip 430 is opened.

Figure 5:
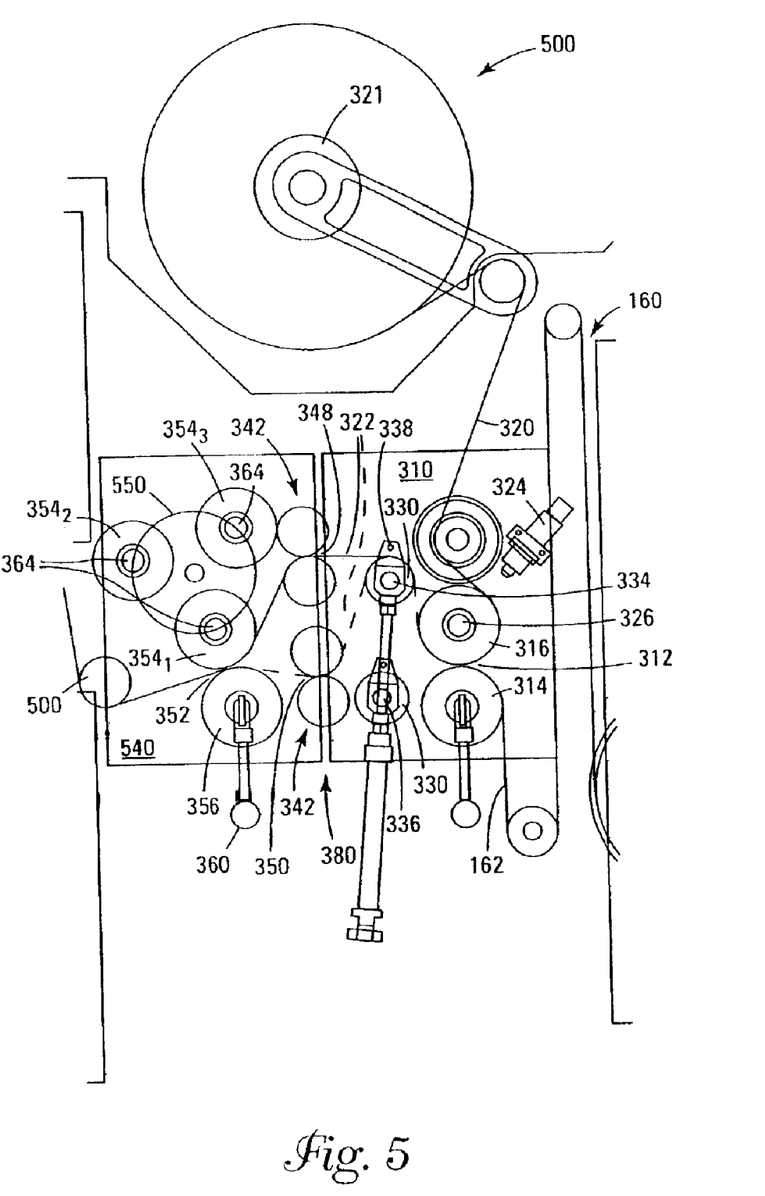
FIG. 5 illustrates a finishing section of a photofinisher according to another embodiment of the present invention.

FIG. 5 illustrates a finishing section 500 of a photofinisher, such as photofinisher 200, according to another embodiment of the present invention. Reference numbers common to FIGS. 3 and 5 are as discussed above for FIG. 3. For one embodiment, finishing section 500 includes the laminator 310 described above. Laminator 310 produces laminate 322, as described above. Laminate 322 is directed from laminator 310 to a texturizer 540, where, for some embodiments, the texture is disposed in transparent medium 320 of laminate 322. Specifically, laminate 322 is directed from roller 330 to between movable rollers 342 of texturizer 540 that move between positions 348 and 350, as described above.

Laminate 322 is directed from rollers 342 to nip 352 between roller 356 and one of rollers 354. For one embodiment, each of rollers 354 is heated as described above. For another embodiment, each of rollers has a different texture. For example, roller $354_1$ may have linen texture, roller $354_2$ canvas texture, and roller $354_3$ brush-stroke texture. Rollers 354 are disposed on a turret 550 for one embodiment. Turret 550 is selectively rotated, e.g., by a stepper motor or other actuator capable of rotating turret 550, to selectively position one of rollers 354 adjacent roller 356, as illustrated in FIG. 5. This enables different textures to be selected and disposed on laminate 322. Laminate 322 is directed from nip 352 to a stationary roller 560 that directs laminate 322 to a post-finisher, such as post-finisher 282 of photofinisher 200 in FIG. 2, for example. Turret 550 is not limited to containing three rollers 354, but can contain more or less than three rollers.

For various embodiments, finishing section 500 can be selectively changed from a texture bypass mode to a texturing mode on the fly. That is, without changing photographic medium 160 and/or without stopping laminator 310. Moreover, while operating in the texturing mode, different textures can be selected on the fly. In the texture bypass mode, e.g., for producing images having a glossy finish, rollers 342 are located in position 350 and nip 352 is open. When rollers 342 are in position 350 and nip 352 is open, rollers 342 and roller 560 hold laminate 322 against roller 356 and away from roller 354, causing laminate 322 to move in contact with roller 356 without contacting roller 354.

In the texturing mode, rollers 342 are located in position 348 and nip 352 is closed. Moving rollers 342 to position 348 brings laminate 322 into contact with roller 354 before laminate 322 enters nip 352, enabling roller 354 to heat laminate 322 before laminate 322 enters nip 352. This softens transparent medium 320, enabling transparent medium 320 to flow into the texture of roller 354, causing the texture to be transferred to transparent medium 320 when laminate 322 is in nip 352 and is squeezed between rollers 354 and 356. Selecting a different texture, involves opening nip 352, e.g., using actuator 360, moving, for example, roller $354_1$ away from roller 356 and roller $354_2$ adjacent roller 356 by rotating turret 550, and closing nip 352.

For some embodiments, changing from the texture bypass mode to the texturing mode or selecting another texture requires that texturizer 540 be stopped, i.e., stopping the transport of laminate 322 through texturizer 540, without stopping laminator 310. To compensate for this or other variations in the speeds of laminate 322 between laminator 310 and texturizer 540, a buffer is disposed between laminator 310 and texturizer 540, as indicated by arrow 380 and described above.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A photofinisher comprising:
   a laminator adapted to produce a laminate comprising a transparent medium disposed on at least one image on a photographic medium;
   a texturizer adapted to dispose a texture in the transparent medium of the laminate during a texturing mode of operation; and
   a first roller configured to selectively hold the laminate in contact with a heated second roller of the laminator after the laminate exits a nip between the heated second roller and a third roller of the laminator.

2. The photofinisher of claim 1, wherein the texturizer comprises a nip between a textured fourth roller and a fifth roller for receiving the laminate, wherein the nip between the textured fourth roller and the fifth roller is selectively openable and closable for respectively causing the photofinisher to operate in a texture bypass mode of operation and the texturing mode of operation.

3. The photofinisher of claim 2, wherein at least one of the textured fourth roller and the fifth roller is selectively movable for selectively opening and closing the nip between the textured fourth roller and the fifth roller.

4. The photofinisher of claim 2, wherein the laminate is squeezed between the textured fourth roller and the fifth roller when the nip between the textured fourth roller and the fifth roller is closed.

5. The photofinisher of claim 2, wherein when the nip between the textured fourth roller and the fifth roller is open, the laminate moves in contact with the fifth roller without contacting the textured fourth roller.

6. The photofinisher of claim 2, wherein the textured fourth roller is heated.

7. The photofinisher of claim 1, further comprising a buffer that directs the photographic medium to the laminator and that is adapted to compensate for variations in speeds of the photographic medium.

8. The photofinisher of claim 1, further comprising a buffer disposed between he laminator and the texturizer, the buffer adapted to compensate for variations in speeds of the laminate between the laminator and the texturizer.

9. The photofinisher of claim 1, further comprising a post-finisher for receiving texturized laminate when the photofinisher is operating in the texturing mode of operation or non-texturized laminate when the photofinisher is operating in a texture bypass mode of operation.

10. The photofinisher of claim 1, wherein the transparent medium is disposed on a fourth roller of the photofinisher.

11. The photofinisher of claim 1 further comprises a fourth roller configured to selectively hold the laminate in contact with a heated textured fifth roller of the texturizer before the laminate enters a nip between the heated textured fifth roller and a sixth roller of the texturizer.

12. The photofinisher of claim 1 further comprises a fourth roller configured to selectively hold the laminate in contact with a heated textured fifth roller of the texturizer after the laminate exits a nip between the heated textured fifth roller and a sixth roller of the texturizer.

13. A photofinisher comprising:
   a laminator adapted to produce a laminate comprising a transparent medium disposed on at least one image on a photographic medium; and
   a texturizer adapted to dispose a texture in the transparent medium of the laminate during a texturing mode of operation;
   wherein the texturizer comprises a plurality of textured rollers, wherein each of the plurality of textured rollers has a different texture and is selectively movable to a position adjacent a second roller so as to form a nip between the respective one of the textured rollers and the second roller for receiving the laminate, wherein the second roller is selectively movable for selectively opening and closing the nip.

14. A photofinisher comprising:
   a laminator adapted to produce a laminate comprising a transparent medium disposed on at least one image on a photographic medium; and
   a texturizer adapted to dispose a texture in the transparent medium of the laminate during a texturing mode of operation;
   wherein the texturizer comprises first and second nips for receiving the laminate, wherein the first nip is between a textured first roller and a second roller and the second nip is between a textured third roller and the second roller, wherein the textured first and third rollers have a different textures, wherein the textured first and third rollers are selectively movable for respectively selectively opening and closing the first and second nips, wherein during the texturing mode of operation, the first nip is closed when the second nip is open or the first nip is open when the second nip is closed and during a texture bypass mode of operation both the first and second nips are open.

15. A photofinisher comprising:

means for forming a laminate from a transparent medium and a photographic medium, the laminate comprising the transparent medium disposed on one or more images of the photographic medium;

means for transferring a texture to the transparent medium during a texturing mode of operation, wherein the texture transferring means comprises two or more different textures that are selectable; and means for passing the laminate through the photofinisher without transferring the texture to the transparent medium during a texture bypass mode of operation.

16. A photographic processor comprising:

a printer adapted to receive image data and to print one or more images corresponding to the image data on a photographic medium; and a photofinisher comprising:

a laminator adapted to produce a laminate comprising a transparent medium disposed on the one or more images of the photographic medium, wherein the laminator receives the photographic medium from the printer and the transparent medium separately and outputs the laminate; and a texturizer adapted to dispose a texture in the transparent medium of the laminate during a texturing mode of operation;

wherein the texturizer comprises a plurality of textured rollers, wherein each of the plurality of textured rollers has a different texture and is selectively movable to a position adjacent a second roller so as to form a nip between the respective one of the textured rollers and the second roller for receiving the laminate, wherein the second roller is selectively movable for selectively opening and closing the nip.

17. A photofinisher comprising:

a laminator adapted to produce a laminate comprising a transparent medium disposed on at least one image on a photographic medium;

a texturizer adapted to dispose a texture in the transparent medium of the laminate during a texturing mode of operation; and a first roller configured to selectively hold the laminate in contact with a heated textured second roller of the texturizer before the laminate enters a nip between the heated textured second roller and a third roller of the texturizer.

18. The photofinisher of claim 17 further comprises a fourth roller configured to selectively hold the laminate in contact with the heated textured second roller of the texturizer after the laminate exits the nip between the heated textured second roller and a third roller of the texturizer.

19. A photographic processor comprising:

a printer adapted to receive image data and to print one or more images corresponding to the image data on a photographic medium; and a photofinisher comprising:

a laminator adapted to produce a laminate comprising a transparent medium disposed on the one or more images of the photographic medium, wherein the laminator receives the photographic medium from the printer and the transparent medium separately and outputs the laminate; and a texturizer adapted to dispose a texture in the transparent medium of the laminate during a texturing mode of operation;

wherein the texturizer comprises first and second nips for receiving the laminate, wherein the first nip is between a textured first roller and a second roller and the second nip is between a textured third roller and the second roller, wherein the textured first and third rollers have a different textures, wherein the textured first and third rollers are selectively movable for respectively selectively opening and closing the first and second nips, wherein during the texturing mode of operation, the first nip is closed when the second nip is open or the first nip is open when the second nip is closed and during a texture bypass mode of operation both the first and second nips are open.

* * * * *